United States Patent Office 2,936,297
Patented May 10, 1960

2,936,297

TRICARBOXYLIC ACID POLYESTERS

Abraham Bavley, Brooklyn, and Charles J. Knuth, Flushing, N.Y., assignors to Chas. Pfizer & Co., Inc., New York, N.Y., a corporation of Delaware No Drawing. Application September 5, 1956
Serial No. 607,981

6 Claims. (Cl. 260—45.4)

The present invention relates to new and improved tricarboxylic acid polyesters, polymerization products thereof, and the process of producing the same. More particularly, the present invention relates to the esterification of certain tricarboxylic acids with a glycol and certain unsaturated monohydric alcohols, polymerization and copolymerization products thereof, and the process of producing the same.

In accordance with the present invention, it has been discovered that valuable tricarboxylic acid polyesters, polymers and copolymers thereof may be produced from citric acid or tricarballylic acid upon proper selection of a dihydric alcohol and an unsaturated monohydric alcohol providing certain reaction proportions and conditions are adhered to. The resulting polyester resins have excellent properties.

Laminated products and rigid, transparent castings may be prepared by polymerization of the resins or by copolymerization of the resins with copolymerizable monomers, such as methyl methacrylate, dimethyl itaconate, triallyl citrate, and vinyl acetate in the presence of a peroxide catalyst. With respect to certain preferred polyesters of the present invention, it has been found that the preferred dihydric alcohol reactants are ethylene and propylene glycol insofar as water- and caustic-resistance properties and electrical properties are concerned. On the other hand, resins formed with diethylene glycol yield higher tensile strength but must be copolymerized with a material such as methyl methacrylate in order to obtain a combination of tensile strength and water- and caustic-resistant properties. Diethylene and propylene glycol reactants are preferred for the dihydric alcohol component when high heat resistance is desired.

In accordance with the prior art, commercial polyester resins may be produced successfully by employing a single stage reaction, i.e., heating the carboxylic acid, polyhydric alcohol and unsaturated monohydric alcohol in one step. Although useful products result when heating a mixture of a tricarboxylic acid such as citric acid, a dihydric alcohol such as ethylene glycol, and an unsaturated monohydric alcohol such as allyl alcohol, these products have certain disadvantages as compared with the products of the present invention. Thus, the products of this single step process are extremely viscous and often remain incompletely miscible with the reaction solvent during reaction. Upon neutralization of the end product, emulsions are often formed and these are particularly difficult to separate. In addition, certain process difficulties, such as excessive loss of allyl alcohol, are encountered.

Another method for preparing resins of the general type with which the present invention is concerned involves partial esterification of the tricarboxylic acid with the unsaturated monohydric alcohol and subsequent esterification with the dihydric alcohol. The products of such a reaction differ from those of the present invention in that they are of relatively low reactivity during polymerization and produce, without the presence of a co-monomer, weak rubbery solids. In addition, this method of producing these resins requires careful temperature control in order to avoid gelation, i.e., apparently owing to polymerization of the allyl unsaturation.

In accordance with the process of the present invention, it has been unexpectedly discovered that certain tricarboxylic acid polyesters may readily be produced without the attendant disadvantages of the above outlined processes providing the tricarboxylic acid is first esterified with a glycol by heating a mixture of the two containing certain critical molar ratios and then heating the resulting acidic glycol ester with an unsaturated monohydric alcohol, namely allyl alcohol and/or methallyl alcohol. The products resulting from this process produce rigid, optically clear, transparent castings upon further curing and unlike other types of unsaturated polyesters need not be cured by copolymerization with a low molecular weight monomer. This latter feature has the advantage of eliminating volatilization of low molecular weight volatiles during curing and hence avoids the necessity of expensive high-pressure molding equipment. However, and if desired for the purpose of imparting unusually high tensile strength, the polyester resins of the present invention may be copolymerized with low molecular weight monomers without volatile loss during polymerization providing relatively mild temperature conditions of curing are selected. Mild temperature conditions of up to 90° C. are not objectionable in view of the relatively fast rate of polymerization when employing peroxide catalysts of the type described hereinafter. As illustrated in the examples, the polyester resins of the present invention are also useful for producing laminated products by polymerization or copolymerization.

In accordance with the process of the present invention, it has been found that partial esterification of a tricarboxylic acid, selected from the group consisting of citric acid and tricarballylic acid may be accomplished by heating the acid in the presence of a glycol providing the molar ratio of glycol to acid is within the range 3:4 to 1:2. The upper limit, i.e., 3:4, is critical in that it is found that when this ratio is exceeded, premature gelation occurs during the partial esterification step. On the other hand, the lower limit, i.e., 1:2, is critical in order to yield a partially esterified product of reasonably high molecular weight and viscosity. A reasonably high molecular weight and viscosity are desirable in order to reduce polymerization shrinkage, to reduce run-off of the resin from the filler when laminating, and to reduce polymerization time. A preferred molar ratio is about 3:4.

In accordance with the first step of the process of the present invention, the preferred means of heating is by refluxing the mixture in the presence of an azeotroping solvent. Preferred solvents include toluene and benzene, the concentration of solvent being preferably from about 5 to 50% by weight of the original charge. The purpose of the azeotroping solvent is, of course, to remove water of reaction by azeotropic distillation.

Although anhydrous citric acid or tricarballylic acid are preferred, the hydrates of these acids may be used and water of hydration removed during esterification. Among the preferred glycols are ethylene, butylene, diethylene, and triethylene glycols. The hydroxyl groups of the glycols may be in various positions, i.e., 1,2-propylene glycol or propanediol-1,3 may be used.

Preferably, a catalyst is employed for the first step of the reaction, i.e., partial esterification of the tricarboxylic acid. Although p-toluenesulfonic acid is preferred, other catalysts, such as hydrogen chloride, sulfuric acid, and phosphoric acid are satisfactory. The amount of catalyst employed, based on the weight of the reactants for forming the polyester, i.e., including the unsaturated monohydric alcohol, and also including the azeotroping solvent, may range from 0.5 to 5%, a concentration of 1% being preferred. The catalyst of the first step of the reaction also serves as a catalyst for the final esterification of the acidic glycol ester.

The first step, i.e., formation of the acidic glycol ester, is allowed to proceed until the limiting reactant, i.e., the glycol, is substantially completely esterified. This may be judged by the volume of water distilled from the reaction. Upon completion of the first step of the reaction, the reaction mixture is heated with an unsaturated monohydric alcohol selected from the group consisting of allyl and methallyl alcohol. The amount of this alcohol employed should be at least equivalent to that theoretically required for complete esterification of the acidic glycol ester. Thus, in the case of a first reaction step between a mixture containing 4 mols of citric acid and 3 mols of glycol, at least 6 mols of allyl alcohol should be added to the first step reaction product. For the purpose of compensating for slight losses of allyl or methallyl alcohol occurring during completion of esterification, and in order to complete esterification in a reasonable time, a slight excess of the selected alcohol is desirable, i.e., from about 5–25% by weight in excess of that theoretically required.

As in the case of the first step of partial esterification, the second step of the process of the present invention is preferably carried out under refluxing conditions. A preferred means of carrying out this step of the process includes the use of an inert atmosphere such as nitrogen, carbon dioxide or hydrogen, and the use of an addition polymerization inhibitor. Preferred inhibitors include hydroquinone and p-tertiary-butyl catechol. The addition polymerization inhibitor is preferably added in admixture with the allyl or methallyl alcohol, 0.001 to 0.1% by weight of inhibitor based on the total weight of the reactants for forming the polyester being preferred.

The preferred polyester resins of the present invention are those in which the degree of esterification of the tricarboxylic acid is at least 90%, outstanding products resulting when the degree of esterification is 95% and higher. For the purpose of determining the degree of esterification, measuring the quantity of water distilled during reaction or titration of a sample of the product with standard caustic solution are satisfactory. Upon completion of the reaction, the polyester resin is preferably neutralized in order to obtain products upon polymerization or copolymerization of improved water resistance, stability on aging, electrical properties, etc.

For the purpose of polymerizing the tricarboxylic acid polyesters of the present invention, they may be heated in air or subjected to prolonged exposure to ultra-violet light. However, polymerization by heating with catalysts, such as benzoyl peroxide, tertiary-butyl hydroperoxide, tertiary-butyl perbenzoate, di-tertiary-butyl peroxide, methyl ethyl ketone peroxide, etc. is preferred. Of these catalysts benzoyl peroxide is preferred. The amount of catalyst employed ordinarily ranges from 0.1 to 4% by weight of the polyester, about 0.5 to 1.5% being preferred for cast products and 2.0 to 4.0% being preferred for laminated products.

Certain preferred products as indicated above result when copolymerizing the esters of the present invention with a copolymerizable monomer such as methyl methacrylate, vinyl acetate, triallyl citrate, dimethyl itaconates, etc., from about 5 to about 50% by weight of comonomer based on the weight of the polyester generally being preferred. Specific Example V illustrates copolymerization in accordance with the present invention when employing methyl methacrylate as a comonomer. As indicated in this example, castings are possible during copolymerization while avoiding loss of volatile comonomer.

The following examples are for the purpose of illustration only and are not limiting to the scope of the invention which is set forth in the claims.

*Example I*

576 g. anhydrous citric acid (3 mols)
239 g. diethylene glycol (2.25 mols)
400 ml. toluene
14.6 g. p-toluenesulfonic acid The above reactants were heated at reflux temperature in a Dean-Stark apparatus for 6 hours, the liquid temperature ranging from 99 to 111° C. during this period. A total of 83 ml. of water was distilled off. The reaction mixture now consisted of 2 layers, i.e., a heavy syrup and a liquid of low viscosity.

Next, 300 g. (115% of theory) of allyl alcohol containing 0.15 g. hydroquinone were added and refluxing was continued under an atmosphere of nitrogen. The mixture soon formed a clear homogeneous solution. After 20 hours of refluxing (liquid temperature 80 to 118° C.), 107.5 ml. of water containing minor amounts of allyl alcohol had been distilled over. Titration of a sample showed that the citric acid was 98.4% esterified.

The reaction mixture was neutralized by stirring with 550 ml. of 2% sodium bicarbonate solution containing sodium chloride to promote the separation of phases. The separated organic phase was dried with magnesium sulfate, filtered, and concentrated at about 20 mm. Hg pressure in a boiling water bath to remove toluene and residual allyl alcohol. 843 grams (92% of theory) were obtained as a viscous oil ($n_D^{22}=1.4882$; $d_4^{29}=1.25$; $\mu^{29}=176$ poises).

*Example II*

576 g. anhydrous citric acid (3 mols)
140 g. ethylene glycol
350 ml. toluene
13.2 g. p-toluenesulfonic acid The above reactants were refluxed as in Example I at 99–109° C. for 4½ hours, and 79 ml. water were separated by distillation. 300 g. of allyl alcohol plus 0.15 g. hydroquinone were added and refluxing was resumed under nitrogen. 107.4 ml. of water, containing minor amounts of allyl alcohol, were collected after 27 hours at 92–107° C. Titration showed that the citric acid was 96.4% esterified. After neutralization, drying and concentrating, 803 g. (98% of theory) of a viscous oil were obtained. ($d_4^{27.5}=1.26$; $\mu^{29}=943$ poises).

*Example III*

576 g. anhydrous citric acid
171 g. 1,2-propylene glycol
350 ml. toluene
13.5 g. p-toluenesulfonic acid The above reactants were refluxed as in Example I at 101–109° C. and 82 ml. water were distilled in step 1 in 4½ hours. Allyl alcohol and hydroquinone were then added in the same quantity as in Example I and refluxing was resumed under nitrogen. 111.5 ml. of aqueous layer were collected and the citric acid was 96.4% esterified. After neutralization and concentration 817 grams (96.5% of theory) of viscous oil were obtained ($n_D^{22}=1.4862$; $d_4^{27.5}=1.21$; $\mu^{30}=94$ poises).

*Example IV*

To polymerize the products of Examples I through III 3% of a comercial paste containing 50% benzoyl peroxide in tricresyl phosphate was dissolved in each. The syrups were cast in molds and heated for 16 hours at 65° C., followed by 8 hours at 90° C. The properties of the resulting transparent or translucent, rigid products are given in the table below.

| Product of Example No. | I | II | III |
|---|---|---|---|
| Polymerization Shrinkage, percent | 7 | 8 | 8 |
| Tensile strength, p.s.i. | 8,500 | 6,800 | 3,300 |
| Rockwell M hardness | 100 | 112 | 112 |
| Heat Distortion Temp., °F. | 190 | 153 | 195 |
| Water Absorption, 24 hours, percent | 0.57 | 0.40 | 0.44 |

Example V

The syrup prepared in Example I was interpolymerized with varying concentrations of methyl methacrylate by heating with the same catalyst as in Example IV. Polymerization was carried out for 3 days, the temperature being raised gradually from 45 to 90° C. These milder conditions were selected to avoid the formation of bubbles in the final polymers due to vaporization of methyl methacrylate. Special precautions were taken to seal the mold during polymerization to avoid loss of methyl methacrylate by vaporization. Catalyst concentrations and physical properties of the resulting transparent, rigid products are given in the table below.

| Methyl Methacrylate Conc., Percent by weight | 15 | 30 | 45 |
|---|---|---|---|
| Catalyst Concentration, Percent | 1.5 | 1.5 | 1.0 |
| Polymerization Shrinkage, Percent | 10 | 13 | 14 |
| Tensile Strength, p.s.i. | 8,500 | 10,100 | 7,400 |
| Rockwell M hardness | 99 | 103 | 102 |
| Heat Distortion Temp., ° F | 179 | 179 | 176 |
| Water absorption, 24 hours, percent | 0.43 | 0.31 | 0.29 |

Example VI

Nine swatches, 6 x 9", were cut from a commercial cloth woven from glass fiber and known as Fiberglas cloth #181 (Volan finish, 8 mil weight). The syrup prepared as in Example III and containing 6% of a commercial paste consisting of 50% benzoyl peroxide in tricresyl phosphate was applied to the swatches and these were assembled into a stack. The impregnated cloth was cured by heating for two hours at 140° C. under a pressure of 0.5 p.s.i. The product was a strong, rigid laminate containing 45% polymerized polyester and 55% glass cloth.

Example VII 528 g. tricarballylic acid
239 g. diethylene glycol
400 ml. benzene
14.1 g. conc. sulfuric acid The above reactants were refluxed as in Example I until 81 ml. water were distilled in step 1. Allyl alcohol and hydroquinone were then added in the same quantity as in Example I and refluxing was resumed under nitrogen until the citric acid was substantially completely esterified. An oily product was obtained by neutralization and concentration of the reaction mixture.

Example VIII

The syrup prepared in Example I was interpolymerized with vinyl acetate, dimethyl itaconate and triallyl citrate. In each case 3 parts of low molecular weight monomer was employed together with 7 parts of the polyester syrup. To each was added 0.1 part ter-butyl hydroperoxide or di-ter-butyl perbenzoate. Upon heating, rigid transparent or translucent polymers were obtained.

What is claimed is:

1. A process of producing a tricarboxylic acid polyester which comprises the steps of heating, at esterification temperature, a mixture of a glycol selected from the group consisting of a lower alkane diol, diethylene glycol and triethylene glycol and acid selected from the group consisting of citric acid and tricarballylic acid, the molar ratio of the glycol to acid being from 3:4 to 1:2, until the glycol is substantially completely esterified; and then heating, at esterification temperature, resulting acidic glycol ester with an unsaturated monohydric alcohol selected from the group consisting of allyl alcohol and methallyl alcohol, the amount of unsaturated monohydric alcohol being at least equivalent to that required for complete esterification of the acidic glycol ester and the degree of esterification being at least about 90%.

2. A process of producing a tricarboxylic acid polyester which comprises the steps of heating, at esterification temperature, a mixture of a glycol selected from the group consisting of a lower alkane diol, diethylene glycol and triethylene glycol and an acid selected from the group consisting of citric acid and tricarballylic acid, the molar ratio of the glycol to acid being from 3:4 to 1:2 until the glycol is substantially completely esterified; heating, at esterification temperature, resulting acidic glycol ester with an unsaturated monohydric alcohol selected from the group consisting of allyl alcohol and methallyl alcohol, the amount of alcohol being at least equivalent to that required for complete esterification of the acidic glycol ester and the degree of esterification being at least about 90%; and heating resulting tricarboxylic acid polyester in the presence of a catalytic amount of an organic peroxide polymerization catalyst to obtain a solid polymerization product.

3. A process of producing a tricarboxylic acid polyester which comprises the steps of heating, at esterification temperature, a mixture of a glycol selected from the group consisting of a lower alkane diol, diethylene glycol and triethylene glycol and an acid selected from the group consisting of citric acid and tricarballylic acid, the molar ratio of the glycol to acid being from 3:4 to 1:2, until the glycol is substantially completely esterified; heating, at esterification temperature, resulting acidic glycol ester with an unsaturated monohydric alcohol selected from the group consisting of allyl alcohol and methallyl alcohol, the amount of alcohol being at least equivalent to that required for complete esterification of the acidic glycol ester and the degree of esterification being at least about 90%; and heating resulting tricarboxylic acid polyester admixed with from 5 to 50% by weight of a copolymerizable ester monomer containing from one to three $CH_2=C<$ groups in the presence of a catalytic amount of an organic peroxide catalyst to obtain a solidified copolymer.

4. A tricarboxylic acid polyester produced by the process of claim 1.

5. A polymerized tricarboxylic acid polyester produced by the process of claim 2.

6. A copolymerized tricarboxylic acid polyester produced by the process of claim 3.

References Cited in the file of this patent

UNITED STATES PATENTS

| 1,921,756 | Kienle | Aug. 8, 1933 |
| 2,280,242 | Kropa | Apr. 21, 1942 |
| 2,418,633 | Gould | Apr. 8, 1947 |